United States Patent [19]
Mishima et al.

[11] Patent Number: 5,514,496
[45] Date of Patent: May 7, 1996

[54] NONAQUEOUS SECONDARY BATTERY

[75] Inventors: Masayuki Mishima; Yoshio Idota, both of Kanagawa, Japan

[73] Assignee: Fuji Photo Film Co., Ltd., Kanagawa, Japan

[21] Appl. No.: 393,483

[22] Filed: Feb. 24, 1995

[30]  Foreign Application Priority Data

Feb. 28, 1994 [JP] Japan .................................. 6-030207

[51] Int. Cl.⁶ .............................. H01M 4/58; H01M 4/36
[52] U.S. Cl. ...................... 429/218; 429/194; 429/224; 429/225; 429/229
[58] Field of Search ................................ 429/194, 225, 429/229, 218, 224

[56] References Cited

U.S. PATENT DOCUMENTS 5,284,721  2/1994  Beard ........................ 429/194

FOREIGN PATENT DOCUMENTS 0582173  2/1994  European Pat. Off. ..
0615296  9/1994  European Pat. Off. ..

Primary Examiner—Stephen Kalafut
Assistant Examiner—Richard H. Lilley, Jr.
Attorney, Agent, or Firm—Sughrue, Mion, Zinn, Macpeak & Seas

[57]  ABSTRACT

A nonaqueous secondary battery is disclosed, which comprises a positive electrode active material, a negative electrode active material, and a nonaqueous electrolyte containing a lithium salt, in which said negative electrode active material contains at least one chalcogenide compound mainly composed of a Group 14 element of the Periodic Table, a Group 15 element of the Periodic Table, In, Zn, or Mg.

8 Claims, 2 Drawing Sheets

NONAQUEOUS SECONDARY BATTERY

FIELD OF THE INVENTION

This invention relates to a nonaqueous secondary battery having improved charge and discharge cycle characteristics and improved safety.

BACKGROUND OF THE INVENTION

As a metal chalcogenide, $TiS_2$ (U.S. Pat. No. 3,983,476), $ZrS_2$, $MoS_2$ (JP-A-57-24369), copper-molybdenum sulfide (JP-A-1-24369), etc. have been proposed as a negative electrode active material. However, any of these known compounds has a high oxidation-reduction potential, failing to provide a nonaqueous secondary battery having a discharge potential as high as 3 V and a high capacity.

Also, a metal chalcogenide which is capable of intercalating and deintercalating lithium as a positive electrode has been proposed for use in a nonaqueous battery (for example, JP-A-56-103872, U.S. Pat. Nos. 4,009,052, 3,884,723, 4,013,818).

Examples applying a chalcogenide of Group 14 elements, Group 15 elements, In, Zn, or Mg as an active material for a nonaqueous battery are discussed below (references to Groups 14, 15 and 16 correspond to CAS Group IVA, VA and VIA, respectively. Groups 14, 15 and 16 refer to the new IUPAC notation, as of February 1985).

For example, U.S. Pat. No. 4,223,079 proposes using SnS as a positive electrode active material for a nonaqueous primary battery, JP-A-55-60278 proposes using $SnSe_2$ as a positive electrode active material for a nonaqueous secondary battery, JP-A-56-103872 proposes using a chalcogenide of Group 14 elements, Group 15 elements, In, or Zn as a positive electrode active material for a solid electrolyte battery, and JP-A-61-99279 proposes a chalcogenide of IVB group elements or VB group elements as an intercalation positive electrode of copper cation. However, all of these examples employ a chalcogenide compound as a positive electrode active material. No examples apply a chalcogenide compound as a negative electrode active material have been found.

Examples applying a metal chalcogenide or a metal oxide in both a positive electrode active material and a negative electrode active material are known, for example, in U.S. Pat. No. 3,983,476, JP-A-63-210028, JP-A-63-211564, JP-A-1-294364, JP-A-2-82447, U.S. Pat. No. 4,464,337, *Journal of Power Sources*, vol. 8, page 289 (1982), JP-A-1-120765, JP-A-3-291862. However, any of these known combinations is a nonaqueous secondary battery having a lower discharge potential than 3 V and having a low capacity.

SUMMARY OF THE INVENTION

An object of the present invention is to provide a nonaqueous secondary battery having a high discharge potential and a high discharge capacity, having excellent charge and discharge cycle characteristics, (e.g., the number of cycles after which the discharge capacity is reduced to 60% of that of the first cycle) and having increased safety (e.g., the noncombustible).

The above object of the present invention is accomplished by a nonaqueous secondary battery comprising a positive electrode active material, a negative electrode active material, and an nonaqueous electrolyte containing a lithium salt, in which the negative electrode active material is at least one chalcogenide compound mainly composed of a Group 14 element of the Periodic Table, a Group 15 element of the Periodic Table, In, Zn, or Mg.

DETAILED DESCRIPTION OF THE INVENTION

Figure 1:
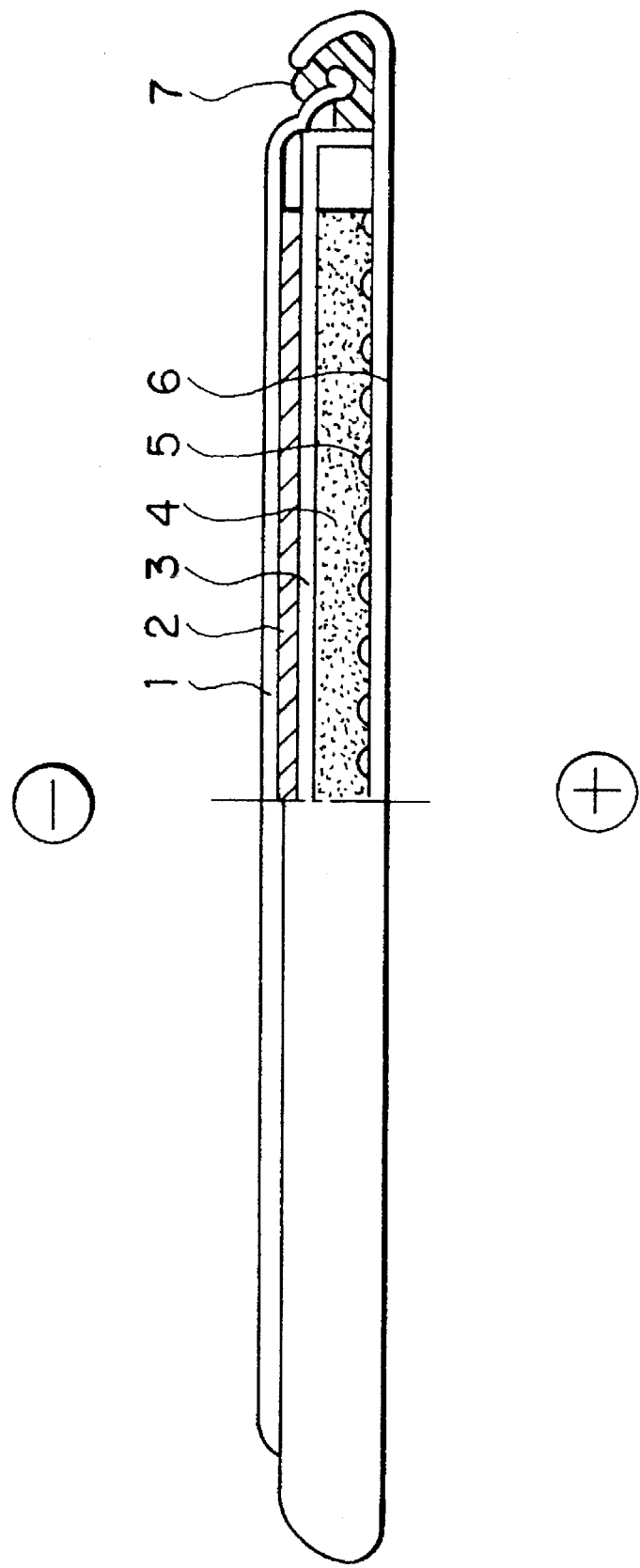
FIG. 1 is a cross section of a coin type battery prepared in Examples, wherein 1 indicates a negative electrode sealing plate, 2 indicates a negative electrode active material mixture pellet, 3 indicates a separator, 4 indicates a positive electrode active material mixture pellet, 5 indicates a collector, 6 indicates a positive electrode case, and 7 indicates a gasket.

The terminology "negative electrode active material precursor" as used herein is explained below. The inventors have found that SnO having an α-PbO structure, $SnO_2$ having a rutile structure, and the like do not act by themselves as a negative electrode active material of a secondary battery but change their crystal structure on intercalation of lithium to act as a reversible negative electrode active material. That is, the charge and discharge efficiency of the first cycle is as low as about 80% or 60%. Thus, the starting material, such as α-PbO-structure SnO or rutile-structure $SnO_2$, namely, a compound before lithium intercalation is called a "negative electrode active material precursor".

The negative electrode active material according to the present invention can be obtained by electrochemically intercalating a lithium ion into, for example, an oxide, an active material precursor. Lithium ion intercalation is conducted until the basic structure of the oxide is changed (for example, until the X-ray diffraction pattern changes) and also until the thus changed basic structure of the Li ion-containing oxide undergoes substantially no change during charging and discharging (for example, the X-ray diffraction pattern does not change substantially). The change in basic structure means change from a certain crystal structure to a different crystal structure or from a crystal structure to an amorphous structure.

It is preferable that the active material precursor which can be used in the present invention is substantially amorphous at the time of battery assembly (before lithium ion intercalation). The term "substantially amorphous" as used herein means that an X-ray diffraction pattern using CuKα rays shows a broad scattering band with peaks between 20° and 40° in terms of 2θ and may contain diffraction assigned to a crystalline structure.

The maximum intensity of the peaks assigned to the crystalline structure appearing between 2θ=40° and 70° is preferably not higher than 500 times, still preferably not higher than 100 times, still more preferably not higher than 5 times, the intensity of the peak of the broad scattering band appearing between 2θ=20° and 40°. It is the most preferred that the pattern exhibits no crystalline diffraction spectrum.

Also, it is preferred that the active material precursor is substantially amorphous at the time of intercalating lithium ion.

In the present invention, either the active material precursor or the active material can be used as a negative electrode. Hereinafter, cases are met in which they are represented as an active material.

The Group 14 elements of the Periodic Table which can be used in the present invention include Si, Ge, Sn, and Pb. The Group 15 elements of the Periodic Table which can be used in the present invention include As, Sb, and Bi. Furthermore, the chalcogenide compound of In, Zn, or Mg is effective in the present invention.

The term "chalcogen" in the present invention means a Group 16 element exclusive of oxygen. Among these, S, Se or Te are preferable.

Exemplary, non-limiting, chalcogenide compounds mainly composed of a Group 14 element of the Periodic Table, a Group 15 element of the Periodic Table, In, Zn, or Mg which can be used in the present invention include, e.g., $SiS_2$, SnS, $SnS_2$, $Sn_2S_3$, PbS, GeS, $GeS_2$, $As_2S_3$, $As_2S_5$, $Sb_2S_3$, $Sb_2S_5$, $Bi_2S_3$, BiS, InS, $In_2S$, $In_2S_3$, ZnS, MgS, $SiSe_2$, SnSe, $SnSe_2$, PbSe, GeSe, $GeSe_2$, $As_2Se_3$, $As_2Se_5$, $Sb_2Se_3$, $Sb_2Se_5$, $Bi_2Se_3$, BiSe, InSe, $In_2Se_3$, ZnSe, MgSe, $SiTe_2$, SnTe, $SnTe_2$, PbTe, GeTe, $GeTe_2$, $As_2Te_3$, $As_2Te_5$, $Sb_2Te_3$, $Sb_2Te_5$, $Bi_2Te_3$, BiTe, InTe, $In_2Te_3$, ZnTe, MgTe.

In the present invention, it is preferable that at least one negative electrode active material is a chalcogenide compound mainly composed of Ge, Sn, Pb, Sb, or Bi. Exemplary, non-limiting, compounds thereof include, e.g., SnS, $SnS_2$, $Sn_2S_3$, PbS, GeS, $GeS_2$, $Sb_2S_3$, $Sb_2S_5$, $Bi_2S_3$, BiS, SnSe, $SnSe_2$, PbSe, GeSe, $GeSe_2$, $Sb_2Se_3$, $Sb_2Se_5$, $Bi_2Se_3$, BiSe, SnTe, $SnTe_2$, PbTe, GeTe, $GeTe_2$, $Sb_2Te_3$, $Sb_2Te_5$, $Bi_2Te_3$, BiTe.

In the present invention, it is more preferable that at least one negative electrode active material is a chalcogenide compound mainly composed of Sn. Exemplary, non-limiting, compounds thereof include, e.g., SnS, $SnS_2$, $Sn_2S_3$, SnSe, $SnSe_2$, SnTe, $SnTe_2$.

In the present invention, the use of any of the above-described chalcogenide compounds mainly composed of the Group 14 elements, the Group 15 elements, In, Zn, or Mg (hereinafter referred to as "the chalcogenide compound of the present invention") affords a nonaqueous secondary battery having excellent charge and discharge cycle characteristics, a high discharge potential, a high capacity and high safety.

The chalcogenide compound of the present invention may contain various compounds, such as transition metals (e.g., Sc, Ti, V, Cr, Mn, Fe, Co, Ni, Cu, Zn, Y, Zr, Nb, Mo, Tc, Ru, Rh, Pd, Ag, Cd, lanthanoid metals, Hf, Ta, W, Re, Os, Ir, Pt, Au, Hg), the Group 2 elements (e.g., Be, Mg, Ca, Sr, Ba), the Group 13 elements (e.g., B, Al, Ga, Tl), the Group 15 elements (e.g., N, P), and the Group 17 elements (e.g., F, Cl, Br, I). Further, it may also contain dopants of various compounds (e.g., compounds of Sb, In, Nb) for improving electrical conductivity. The addition amount thereof is preferably from 0 to 40 mol %.

The chalcogenide compound of the present invention can be synthesized by either a calcination method or a solution method. For instance, Sn sulfides can be synthesized, e.g., by 1) a method in which a mixture of Sn and S is heated at a temperature higher than a melting point of Sn, 2) a method in which Sn and $Na_2S_5$ are eutecticized, 3) sodium thiosulfate is alternating-electrolyzed, 4) a method in which Sn is heated under a stream of $H_2S$, and 5) a method in which $H_2S$ is introduced into a neutral or weak acid solution of stannous chloride or stannic chloride, as disclosed in *Muki Kagaku Zensho* ("Inorganic Chemistry Collection"), vol. XII, page 326 (1963).

The chalcogenide compound of the present invention preferably has an average particle size of from 0.1 to 60 μm.

The desired particle size can be obtained by using well-known grinding machines or classifiers, such as a mortar, a ball mill, a vibration ball mill, a satellite ball mill, a planetary ball mill, a spinning air flow type jet mill, and a sieve.

The positive electrode active material which can be used in the present invention may be a transition metal oxide capable of reversibly intercalating and deintercalating a lithium ion but is preferably a lithium-containing transition metal oxide.

Lithium-containing transition metal oxides which can be used as a positive electrode active material include, for preference, lithium-containing oxides of Ti, V, Cr, Mn, Fe, Co, Ni, Cu, Mo or W. The oxide may contain other alkali metals (the Group 1 and 2 elements) in addition to Li and/or other elements such as Al, Ga, In, Ge, Sn, Pb, Sb, Bi, etc. The ratio of these additional elements is preferably up to 10 mol %, based on the transition metal.

Preferred of the Li-containing transition metal oxides as a positive electrode active material are those prepared from a mixture of a lithium compound and at least one compound of a transition metal selected from Ti, V, Cr, Mn, Fe, Co, Ni, Mo, and W at a lithium compound/total transition metal compounds molar ratio of 0.3 to 2.2.

Still preferred are those prepared from a mixture of a lithium compound and at least one compound of a transition metal selected from V, Cr, Mn, Fe, Co, and Ni at a lithium compound/total transition metal compounds molar ratio of from 0.3 to 2.2.

The most preferred are those represented by formula $Li_xQO_y$ (Q represents at least one transition metal selected from Co, Mn, Ni, V, and Fe; x is from 0.2 to 1.2; and y is from 1.4 to 3). Q may contain, in addition to a transition metal, other metals, such as Al, Ga, In, Ge, Sn, Pb, Sb, Bi, Si, P, B, etc. The ratio of the other metals is preferably up to 30 mol % based on the total transition metals.

Suitable examples of the lithium-containing metal oxide positive electrode active material which can be preferably used in the present invention are $Li_xCoO_2$, $Li_xNiO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, or $Li_xMn_cFe_{2-c}O_4$ (wherein x=0.2 to 1.2; a=0.1 to 0.9; b=0.8 to 0.98; c=1.6 to 1.96; and z=2.01 to 2.3).

The value x in the above formulae is the value before commencement of charging and discharging and varies with a charge and a discharge.

It is preferable that the particle size of a positive electrode active material which can be used in the present invention has an average particle diameter (D) of $3<D\leq9.0$ μm and particles having a particle diameter of 3 to 15 μm occupy 75% by volume or more based on the total volume thereof. More preferably, the particle size thereof has an average particle diameter (D) of $3.5<D\leq8.5$ μm and particles having a particle diameter of 3 to 15 μm occupy 80% by volume or more based on the total volume thereof. Still preferably, the particle size thereof has an average particle diameter (D) of $4.0<D\leq8.0$ μm and particles having a particle diameter of 3 to 15 μm occupy 85% by volume or more based on the total volume thereof. The term "average diameter" used herein means a median diameter, which can be measured by a laser diffraction type particle size distribution measuremenat apparatus.

Moreover, in the positive electrode active material which can be used in the present invention, it is preferable that particles having a particle diameter of 3 μm or less occupy 18% by volume or less and particles having a particle diameter of 15 to 25 μm occupy 13% by volume or less, based on the total volume thereof. More preferably, particles having a particle diameter of 3 μm or less occupy 17% by volume or less and particles having a particle diameter of 15 to 25 μm occupy 7% by volume or less, based on the total volume thereof. Still preferably, particles having a particle diameter of 3 μm or less occupy 16% by volume or less and particles having a particle diameter of 15 to 25 μm occupy 2% by volume or less, based on the total volume thereof. With respect to the cumulative volume distribution, it is preferably D (25%)=3 to 7 μm, D (50%)=4 to 9 μm, D (75%)=5 to 12 μm, D (90%)=6 to 13 μm, more preferably D (25%)=3 to 5 μm, D (50%)=4 to 7 μm, D (75%)=5 to 8 μm, D (90%)=6 to 9 μm, still preferably D (25%)=3 to 5 μm, D (50%)=4 to 6 μm, D (75%)=5 to 7 μm, D (90%)=6 to 9 μm.

Furthermore, in the positive electrode active material which can be used in the present invention, it is preferable to have substantially no particle diameter distribution in the range of less than 1 μm or in the range of more than 25 μm. The term "substantially no particle diameter distribution" used herein means that % by volume of particles of less than 1 μm or less, or particles of more than 25 μm, occupies 3% or less. The % by volume thereof is more preferably 2% or less, still preferably 0%.

While not limiting, the positive electrode active material which can be used in the present invention preferably has a specific surface area of from 0.1 to 20 m²/g, more preferably 0.1 to 5 m²/g, still preferably 0.2 to 1 m²/g (measured by a BET method).

The positive electrode active materials can be synthesized by mixing a lithium compound and a transition metal compound, followed by calcination or by reacting these materials in a solution. The former calcination method is preferred.

Calcination is carried out at a calcination temperature selected from the range in which at least part of the mixed compounds may be decomposed and melted, for example, from 250° to 2000° C., preferably from 350° to 1500° C., for 1 to 72 hours, preferably 2 to 20 hours. Prior to calcination, the mixture is preferably pre-calcined at 250° to 900° C. Mixing of the raw materials may be either dry blending or wet blending. If desired, calcination may be followed by annealing at 200° to 900° C.

In the synthesis of positive electrode active materials, chemical intercalation of a lithium ion into a transition metal oxide is preferably achieved by reacting metallic lithium, a lithium alloy or butyl lithium with the transition metal oxide.

While not limiting, the positive electrode active material to be used in the present invention preferably has an average particle size of from 0.1 to 50 μm.

The resulting positive electrode active material can be ground to size by means of well-known grinding machines or classifiers, such as a mortar, a ball mill, a vibration ball mill, a vibration mill, a satellite ball mill, a planetary ball mill, a spinning air flow type jet mill, and a sieve.

A preferred combination of a negative electrode active material and a positive electrode active material is a combination of at least one chalcogenide compound mainly composed of a Group IVB element of the Periodic Table, a Group VB element of the Periodic Table, In, Zn, or Mg as a negative electrode active material and $Li_xCoO_2$, $Li_xNiO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, or $Li_xMn_cFe_{2-c}O_4$, (x=0.2 to 1.2; a=0.1 to 0.9; b=0.8 to 0.98; c=1.6 to 1.96; and z=2.01 to 2.3) as a positive electrode active material, still preferably a combination of at least one chalcogenide compound mainly composed of Ge, Sn, Pb, Sb, or Bi as a negative electrode active material and $Li_xCoO_2$, $Li_xNiO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, or $Li_xMn_cFe_{2-c}O_4$, (x=0.2 to 1.2; a=0.1 to 0.9; b=0.8 to 0.98; c=1.6 to 1.96; and z=2.01 to 2.3) as a positive electrode active material, most preferably a combination of at lease one chalcogenide compound mainly composed of Sn as a negative electrode active material and $Li_xCoO_2$, $Li_xNiO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, or $Li_xMn_cFe_{2-c}O_4$, (x=0.2 to 1.2; a=0.1 to 0.9; b=0.8 to 0.98; c=1.6 to 1.96; and z=2.01 to 2.3) as a positive electrode active material.

Such combinations of active materials afford a nonaqueous secondary battery having excellent charge and discharge cycle characteristics, a high discharge potential, and a high capacity.

Lithium is intercalated into the chalcogenide compound of the present invention in an amount of from 3 to 10 equivalents.

The ratio of a positive electrode active material to a negative electrode active material is decided according to the above-mentioned equivalent amount. It is preferable to use a positive electrode active material in an amount based on the calculated ratio multiplied by 0.5 to 2. Where any other substance than a positive electrode active material, e.g., metallic lithium, a lithium alloy or butyl lithium, is used as a lithium source, the amount of a positive electrode active material to be used is decided in conformity with the equivalent amount of deintercalated lithium of the negative electrode active material. In this case, too, the ratio based on the equivalent amount is preferably multiplied by 0.5 to 2.

The chalcogenide compound of the present invention may have a crystal structure, an amorphous structure, or a mixed structure thereof. The chalcogenide compound having a crystal structure, as lithium is intercalated, reduces its crystal properties to turn amorphous, and the chalcogenide compound reversively undergoing oxidation and reduction as a negative electrode material is assumed to have a highly amorphous structure.

Negative electrode active materials which may be used in combination with the negative electrode active material of the present invention include metallic lithium, lithium alloys (e.g., alloys with Al, Al—Mn (see U.S. Pat. No. 4,820,599), Al—Mg (see JP-A-57-98977), Al—Sn (see JP-A-63-6742), Al—In, Al—Cd (see JP-A-1-144573)), and calcined carbonaceous compounds capable of intercalating and deintercalating a lithium ion or metallic lithium (see JP-A-58-209864, JP-A-61-214417, JP-A-62-88269, JP-A-62-216170, JP-A-63-13282, JP-A-63-24555, JP-A-63-121247, JP-A-63-121257, JP-A-63-155568, JP-A-63-276873, JP-A-63-314821, JP-A-1-204361, JP-A-1-221859, JP-A-1-274360).

The purpose of the combined use of metallic lithium or a lithium alloy is to intercalate lithium into the chalcogenide compound of the present invention within a cell but not to utilize the dissolution-precipitation reaction of metallic lithium, etc. as an electrode reaction.

An electrode material mixture which can be used in the present invention comprises the above-described active material, a conducting agent, a binder, a filler, and so forth. The conducting agent may be any electron-conducting material which undergoes no chemical change in an assembled battery. Suitable conducting agents include natural graphite (scale graphite, flake graphite, lumpy graphite, etc.), artificial graphite, carbon black, acetylene black, Ketjen black, carbon fiber, metal powders (e.g., copper, nickel, aluminum, silver powder (see JP-A-63-148554)), metallic fibers, polyphenylene derivatives (see JP-A-59-20971), and mixtures of two or more thereof. A combination of graphite and acetylene black is particularly preferred.

The conducting agent is preferably used in an amount of from 1 to 50% by weight, still preferably from 2 to 30% by weight, based on the total weight of the active material mixture. Carbon or graphite is preferably used in an amount of from 2 to 15% by weight.

The binder includes polysaccharides, thermoplastic resins, and rubbery polymers; such as starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyvinylidene fluoride, polyethylene, polypropylene, ethylene-propylenediene terpolymers (EPDM), sulfonated EPDM, styrene-butadiene rubbers, polybutadiene, fluorine rubbers, polyethylene oxide, and mixtures of two or more thereof. In using a compound having a functional group reactive with lithium, such as a polysaccharide, it is preferable to deactivate the functional group by addition of a compound having an isocyanate group. The binder is used in an amount of 1 to 50% by weight, preferably 2 to 30% by weight, based on the total weight of the active material mixture.

In particular, polymers having a decomposition temperature of not lower than 300° C. are preferred as a binder for the negative electrode active material of the present invention. Such polymers include polyethylene, polypropylene, epoxy resins, polyester resins, and fluorine resins, with fluorine resins being preferred. The term "fluorine resin" is used herein as a general term for polymers having a carbon-fluorine bond in the molecule thereof as specified in JIS K6900 "Glossary of Terms Used in Plastic Industry".

Suitable examples of the fluorine resins are shown below.
Polytetrafluoroethylene (PTFE)
(A-2) Polyvinylidene fluoride (PVDF)
(A-3) Tetrafluoroethylene-hexafluoropropylene copolymer (FEP)
(A-4) Tetrafluoroethylene-perfluoroalkyl vinyl ether copolymer (PFA)
(A-5) Vinylidene fluoride-hexafluoropropylene copolymer
(A-6) Vinylidene fluoride-chlorotrifluoroethylene copolymer
(A-7) Ethylene-tetrafluoroethylene copolymer (ETFE resin)
(A-8) Polychlorotrifluoroethylene (PCTFE)
(A-9) Vinylidene fluoride-pentafluoropropylene copolymer
(A-10) Propylene-tetrafluoroethylene copolymer
(A-11) Ethylene-chlorotrifluoroethylene copolymer (ECTFE)
(A-12) Vinylidene fluoride-hexafluoropropylene-tetrafluoroethylene copolymer
(A-13) Vinylidene fluoride-perfluoromethyl vinyl ether-tetrafluoroethylene copolymer Copolymer resins comprising another ethylenically unsaturated monomer in addition to the above-mentioned monomers are also useful. Specific but non-limiting examples of copolymerizable unsaturated monomers include acrylic esters, methacrylic esters, vinyl acetate, acrylonitrile, acrylic acid, methacrylic acid, maleic anhydride, butadiene, styrene, N-vinylpyrrolidone, N-vinylpyridine, glycidyl methacrylate, hydroxyethyl methacrylate, and methyl vinyl ether.

The binder resins can be obtained by any of solution polymerization, emulsion polymerization, suspension polymerization, and gaseous phase polymerization, and the polymer may be any of random polymers, graft polymers, and block polymers.

The above-mentioned binder resin may be used in combination with one or more other polymers, such as carboxymethyl cellulose, sodium polyacrylate, hydroxyethyl cellulose, polyvinyl alcohol, polyvinyl pyrrolidone, polyethylene oxide, and alginic acid.

The binder is preferably used in an amount of from 0.5 to 30% by weight based on the negative electrode active material.

The filler to be used in the present invention is not particularly limited as long as it is a fibrous material undergoing no chemical change in an assembled battery. Suitable fillers include fibers of polyolefins (e.g., polypropylene or polyethylene), glass fiber, and carbon fiber. While not limiting, the filler is preferably used in an amount of up to 30% by weight based on the total weight of the active material mixture.

The nonaqueous electrolytic solution which can be used in the nonaqueous secondary battery of the present invention consists of at least one organic solvent and at least one lithium salt soluble in the solvent. Suitable organic solvents include aprotic solvents, such as propylene carbonate, ethylene carbonate, butylene carbonate, dimethyl carbonate, diethyl carbonate, γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, methyl propionate, ethyl propionate, phosphoric triesters, trimethoxymethane, dioxolane derivatives, sulfolane, 3-methyl-2-oxazolidinone, propylene carbonate derivatives, tetrahydrofuran derivatives (see JP-A-63-32872), ethyl ether, and 1,3-propanesultone. These solvents may be used either individually or in combination of two or more thereof. Suitable lithium salts soluble in these solvents include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, lower aliphatic lithium carboxylates, $LiAlCl_4$, $LiCl$, $LiBr$, $LiI$, chloroboran lithium, and lithium tetraphenylborate. These lithium salts may be used either individually or in combination of two or more thereof. In particular, a solution of $LiCF_3SO_3$, $LiClO_4$, $LiBF_4$ and/or $LiPF_6$ in a mixed solvent of propylene carbonate or ethylene carbonate and 1,2-dimethoxyethane and/or diethyl carbonate is a preferred electrolytic solution.

The amount of the electrolytic solution to be used in a battery is not particularly limited and can be selected according to the amounts of the positive and negative electrode active materials or the size of the battery.

The concentration of the supporting electrolyte is preferably from 0.2 to 3 mols per liter of the electrolytic solution.

In addition to electrolytic solutions, inorganic or organic solid electrolytes may also be employed.

Examples of suitable inorganic solid electrolytes include a lithium nitride, a lithium halide, and a lithium oxyacid salt. Among them preferred are $Li_3N$, $LiI$, $Li_5NI_2$, $Li_3N$—$LiI$—$LiOH$, $LiSiO_4$, $LiSiO_4$—$LiI$—$LiOH$, $xLi_3PO_4$-(1-x)$Li_4SiO_4$, $Li_2SiS_3$, and phosphorus sulfide compounds.

Examples of suitable organic solid electrolytes include polyethylene oxide derivatives or polymers containing the same, polypropylene oxide derivatives or polymers containing the same, polymers containing an ionizing group, a mixture of a polymer containing an ionizing group and the above-mentioned aprotic electrolytic solution, and phosphoric ester polymers. A combination of polyacrylonitrile and an electrolytic solution and a combination of an organic solid electrolyte and an inorganic solid electrolyte are also known.

As a separator, an insulating thin film having high ion permeability and prescribed mechanical strength is used. A sheet or nonwoven fabric made of an olefin polymer (e.g., polypropylene), glass fiber or polyethylene is usually employed for their organic solvent resistance and hydrophobic properties. The pore size of the separator is selected from the range generally used for batteries, e.g., from 0.01 to 10 μm. The thickness of the separator is selected from the range generally used for batteries, e.g., from 5 to 300 μm.

For the purpose of improving charge and discharge characteristics, the electrolytic solution may contain other compounds, such as pyridine, triethyl phosphite, triethanolamine, a cyclic ether, ethylenediamine, n-glyme, hexaphosphoric acid triamide, a nitrobenzene derivative, sulfur, a quinoneimine dye, an N-substituted oxazolidinone and an N,N'-substituted imidazolidinone, an ethylene glycol dialkyl ether, a quaternary anonium salt, polyethylene glycol, pyrrole, 2-methoxyethanol, $AlCl_3$, a monomer providing a conductive polymeric active material, triethylenephosphoramide, a triatkylphosphine, morpholine, an aryl compound having a carbonyl group, hexamethylphosphoric triamide and a 4-alkylmorpholine, a bicyclic tertiary amine, an oil, a quaternary phosphonium salt, and a tertiary sulfonium salt.

In order to make the electrolytic solution incombustible, a halogen-containing solvent, such as carbon tetrachloride or trifluorochloroethylene, may be added to the electrolytic solution. In order to make the electrolytic solution resistant to high-temperature preservation, carbonic acid gas may be incorporated thereto.

The positive or negative electrode active material mixture may contain an electrolytic solution or an electrolyte. For example, it is known to add the above-mentioned ion-conductive polymer or nitromethane or an electrolytic solution to the active material mixture.

The surface of the positive electrode active material may be modified by treating with an esterification agent (see JP-A-55-163779), a chelating agent (see JP-A-55-163780), a conducting high polymer (see JP-A-58-163188 and JP-A-59-14274), polyethylene oxide (see JP-A-60-97561), and the like.

The surface of the negative electrode active material may also be modified by, for example, providing a layer comprising an ion-conductive polymer or polyacetylene (see JP-A-58-111276) or treating with LiCl (see JP-A-58-142771).

A collector for an active material may be made of any electron-conducting substance which undergoes no chemical change in an assembled battery. Suitable materials of a collector for the positive electrode include stainless steel, nickel, aluminum, titanium, calcined carbon; and aluminum or stainless steel with its surface treated with carbon, nickel, titanium or silver. Suitable materials of a collector for the negative electrode include stainless steel, nickel, copper, titanium, aluminum, calcined carbon; copper or stainless steel with its surface treated with carbon, nickel, titanium or silver; and an Al—Cd alloy. These materials may be subjected to surface oxidation. The collector may have a variety of forms, such as a foil, a film, a sheet, a net, a punched sheet, a lath, a porous body, a foamed body, a fibrous body, and so on. While not limiting, the thickness of the collector is from 1 to 500 μm.

The battery according to the present invention may have any shape, such as a coin shape, a button shape, a sheet shape, a cylindrical shape, and an angular shape.

A coin-shaped or button-shaped battery is generally produced by compressing a positive or negative active material mixture into a pellet having prescribed thickness and diameter according to the size of the battery. A sheet, cylindrical or angular battery is generally produced by coating a collector with a positive or negative active material mixture, followed by drying and compressing. The thickness, length or width of the coating layer are decided according to the size of the battery. In particular, the dry thickness (thickness after compression) is preferably selected from the range 1 to 2000 μm.

The application of the nonaqueous secondary battery of the present invention is not particularly limited. For example, it is useful in electronic equipment, such as notebook-size color or monochromatic personal computers, pen input personal computers, pocket-size (palmtop) personal computers, notebook-size word processors, pocket-size word processors, electron book players, pocket phones, wireless extensions of key telephone sets, pagers, handy terminals, portable facsimiles, portable copying machines, portable printers, headphone stereos, video cameras, liquid crystal TV sets, handy cleaners, portable CD, mini disk systems, electrical shavers, machine translation systems, land mobile radiotelephones, transceivers, electrical tools, portable calculators, memory cards, tape recorders, radios, backup powers, and so on; automobiles, electrically-powered vehicles, motors, lights, toys, family (home) computers, load conditioners, irons, watches, stroboscopic lamps, cameras, medical equipment (e.g., pacemakers, hearing aids, and massaging machines); military equipment; and spacecraft equipment. The nonaqueous secondary battery of the present invention may be used in combination with solar batteries.

The present invention will now be illustrated in greater detail with reference to Examples, but the present invention should not be construed as being limited thereto. All the percents are by weight unless otherwise indicated.

(Synthesis A)

11.9 g of tin powder and 6.4 g of sulfur powder were dry blended, put in an aluminum crucible, heated at 1000° C. in an argon atmosphere for 5 hours. After naturally cooling to room temperature, the resulting SnS lump was coarsely ground and further pulverized in a jet mill to obtain SnS having an average particle diameter of 5 μm. In the same manner, $SIS_2$, PbS, $Sb_2S_3$, BiS, InS, MgS, SnSe, PbSe, $Sb_2Se_3$, BiSe, InSe, SnTe, PbTe, $Sb_2Te_3$, BiTe, MgTe were synthesized starting with the respective metal powders and sulfur powders, selenium powders or tellurium powders in the stoichiometric amounts of the respective raw materials.

(Synthesis B)

In a four-necked flask having a capacity of 500 ml equipped with a stirring rod, a gas introducing tube, a dropping funnel and a reflux tube, was charged 26.1 g of stannic chloride, and dissolved in 300 ml of distilled water. Then, while stirring, 35% aqueous hydrochloric acid solution was added dropwise thereto until the system became pH=2.2. Thereafter, a hydrogen sulfide gas was introduced through the gas introducing tube to obtain a yellowish colloid precipitate. The resulting precipitate was separated by filtration and washed thrice with distilled water, and dried to obtain $SnS_2$. The $SnS_2$ thus obtained was pulverized in a jet mill to obtain SnS having an average particle diameter of 2 μm.

In the same manner, $GeS_2$, $As_2S_5$, $Sb_2S_5$, $Bi_2S_3$, ZnS, $SnSe_2$, $GeSe_2$, $As_2Se_5$, $SnTe_2$, and $GeTe_2$ were synthesized starting with the respective metal chlorides or oxides and hydrogen sulfides, hydrogen selenides, or hydrogen tellurides in the stoichiometric amounts of the respective raw materials.

(Synthesis C)

13.7 g of GeS$_2$ powder obtained in Synthesis B and 7.3 g of metallic germanium powder were dry blended, put in an aluminum crucible, reacted at 500° C. in an carbon dioxide atmosphere for 12 hours. After naturally cooled to room temperature, the resulting GeS lump was coarsely ground and further pulverized in a jet mill to obtain GeS having an average particle diameter of 5 μm.

EXAMPLE 1

A coin type nonaqueous secondary battery having the structure shown in FIG. 1 was assembled in a dry box (dry air; dew point: −40° to −70° C.) using the following materials.

Electrode

A negative electrode active material mixture consisting of 82% of each of compounds shown in Table 1 (prepared above), 8% of flake graphite and 4% of acetylene black as conducting agents, and 6% of polyvinylidene fluoride as a binder was compression molded to obtain a negative electrode pellet of 13 mm in diameter and 22 mg in weight. Before use, the pellet was dried in the above-described dry box by means of a far infrared heater at 150° C. for 3 hours.

Counter Electrode

A positive electrode active material mixture consisting of 82% of LiCoO$_2$ as a positive electrode active material, 8% of flake graphite, 4% of acetylene black, and 6% of tetrafluoroethylene was compression molded to obtain a pellet of 13 mm in diameter. The weight of the pellet was decided according to the lithium intercalation capacity of the negative electrode active material, and the charge capacity of LiCoO$_2$ was 170 mAh/g. Before use, the pellet was dried in the same dry box as used above at 150° C. for 3 hours by means of a far infrared heater.

Collector

A 80 μm thick net of SUS316 was welded to each of the positive electrode case and the negative electrode case.

Electrolytic Solution

200 μl of a 1 mol/l solution of LiPF$_6$ in a 2:2:6 (by volume) mixture of ethylene carbonate, butylene carbonate and dimethyl carbonate.

Separator

A finely porous polypropylene sheet and polypropylene nonwoven fabric impregnated with the electrolytic solution.

The resulting nonaqueous secondary battery was subjected to a charge and discharge test under conditions of a constant current density of 0.75 mA/cm$_2$, a voltage between 4.3 V and 2.7 V. All the tests were started with charging. The results obtained are shown in Table 1.

Symbols used in Table 1 have the following meanings:

(a) . . . negative electrode active material of the present invention (b) . . . lithium deintercalation capacity in the first cycle (mAh/g-negative electrode active material)

(c) . . . average potential (V) of lithium deintercalation (d) . . . cycle characteristics (the number of the cycles at which the discharge capacity was reduced to 60% of that of the first cycle)

TABLE 1

| Run No. | (a) | (b) (mAh/g) | (c) (V) | (d) (cycles) |
|---|---|---|---|---|
| 1 | SnS | 485 | 3.53 | 257 |
| 2 | SiS$_2$ | 327 | 3.44 | 77 |
| 3 | SnS$_2$ | 453 | 3.53 | 267 |
| 4 | PbS | 475 | 3.38 | 138 |
| 5 | GeS | 451 | 3.58 | 172 |
| 6 | GeS$_2$ | 428 | 3.58 | 181 |
| 7 | As$_2$S$_5$ | 328 | 3.11 | 125 |
| 8 | Sb$_2$S$_3$ | 362 | 3.06 | 116 |
| 9 | Sb$_2$S$_5$ | 350 | 3.02 | 140 |
| 10 | Bi$_2$S$_3$ | 406 | 3.19 | 129 |
| 11 | BiS | 422 | 3.20 | 160 |
| 12 | InS | 318 | 3.18 | 88 |
| 13 | ZnS | 302 | 3.31 | 99 |
| 14 | MgS | 318 | 3.45 | 101 |

The results in Table 1 reveal that the negative electrode active material according to the present invention provides a nonaqueous secondary battery having excellent charge and discharge cycle characteristics, a high discharge potential, and a high capacity.

EXAMPLE 2

A coin type nonaqueous secondary battery was prepared and tested in the same manner as in Example 1, except for using each of compounds shown in Table 2 (prepared above) as a negative electrode active material. The results are shown in Table 2.

TABLE 2

| Run No. | (a) | (b) (mAh/g) | (c) (V) | (d) (cycles) |
|---|---|---|---|---|
| 1 | SnSe | 481 | 3.54 | 240 |
| 2 | SnSe$_2$ | 462 | 3.53 | 262 |
| 3 | PbSe | 465 | 3.53 | 142 |
| 4 | GeSe$_2$ | 425 | 3.57 | 190 |
| 5 | As$_2$Se | 319 | 3.10 | 118 |
| 6 | Sb$_2$Se | 362 | 3.05 | 153 |
| 7 | BiSe | 431 | 3.17 | 162 |
| 8 | InSe | 303 | 3.18 | 87 |

The results in Table 2 reveal that the negative electrode active material according to the present invention provides a nonaqueous secondary battery having excellent charge and discharge cycle characteristics, a high discharge potential, and a high capacity.

EXAMPLE 3

A coin type nonaqueous secondary battery was prepared and tested in the same manner as in Example 1, except for using each of compounds shown in Table 3 (prepared above) as a negative electrode active material. The results are shown in Table 3.

TABLE 3

| Run No. | (a) | (b) (mAh/g) | (c) (V) | (d) (cycles) |
|---|---|---|---|---|
| 1 | SnTe | 462 | 3.54 | 228 |
| 2 | SnTe$_2$ | 418 | 3.53 | 241 |
| 3 | PbTe | 410 | 3.33 | 130 |
| 4 | GeTe$_2$ | 403 | 3.58 | 188 |
| 5 | Sb$_2$Te | 358 | 3.02 | 159 |
| 6 | BiTe | 421 | 3.17 | 150 |

TABLE 3-continued

| Run No. | (a) | (b) (mAh/g) | (c) (V) | (d) (cycles) |
|---|---|---|---|---|
| 7 | InTe | 311 | 3.16 | 101 |

The results in Table 2 reveal that the negative electrode active material according to the present invention provides a nonaqueous secondary battery having excellent charge and discharge cycle characteristics, a high discharge potential, and a high capacity.

COMPARATIVE EXAMPLE 1

A coin type nonaqueous secondary battery was prepared and tested in the same manner as in Example 1, except for using $TiS_2$ or $MoS_2$ as a negative electrode active material. The results are shown in Table 4.

TABLE 4

| Run No. | (a) | (b) (mAh/g) | (c) (V) | (d) (cycles) |
|---|---|---|---|---|
| 1 | $TiS_2$ | 127 | 1.72 | 104 |
| 2 | $MoS_2$ | 115 | 1.50 | 110 |

It is seen that the use of the chalcogenide compound of the present invention as a negative electrode active material provides a battery superior to that using $TiS_2$ or $MoS_2$ in terms of charge and discharge cycle characteristics, a discharge potential, and a discharge capacity.

COMPARATIVE EXAMPLE 2

A coin type nonaqueous secondary battery was prepared as in Example 1, except for using a negative electrode active material mixture consisting of 82% of a carbonaceous coal type coke ("LCP-u" of Nippon Steel Co., Ltd.) as a negative electrode active material, 12% of acetylene black as a negative electrode conducting agent, and 6% of an ethylenepropylene-diene copolymer ("ESPREN" of Sumitomo Chemical Co., Ltd.) as a negative electrode binder.

The resulting nonaqueous secondary battery was subjected to a charge and discharge test under conditions of a constant current density of 0.75 $mA/cm^2$, a voltage between 3.95 V and 2.7 V. The test was started with charging. The results obtained are shown in Table 5.

TABLE 5

| Run No. | (a) | (b) (mAh/g) | (c) (V) | (d) (cycles) |
|---|---|---|---|---|
| 1 | LCP-u | 150 | 3.60 | 72 |

It is seen that the use of the chalcogenide compound of the present invention as a negative electrode active material provides a battery superior to that using a carbonaceous material in terms of charge and discharge cycle characteristics and a discharge capacity.

EXAMPLE 4

A coin type nonaqueous secondary battery was prepared and tested in the same manner as in Run No. 1 of Example 1, except for replacing $LiCoO_2$ as a positive electrode active material with $LiNiO_2$, $LiCo_{0.95}V_{0.05}O_{2.07}$ or $LiMn_2O_4$. The results obtained are shown in Table 6.

TABLE 6

| Run No. | Positive Electrode Active Material | (b) (mAh/g) | (c) (V) | (d) (cycles) |
|---|---|---|---|---|
| 1 | $LiCoO_2$ | 485 | 3.53 | 257 |
| 2 | $LiNiO_2$ | 491 | 3.42 | 263 |
| 3 | $LiCo_{0.95}V_{0.05}O_{2.07}$ | 481 | 3.53 | 308 |
| 4 | $LiMn_2O_4$ | 472 | 3.55 | 261 |

It is seen that the battery according to the present invention is excellent in all of charge and discharge cycle characteristics, discharge potential, and discharge capacity regardless of which of the above positive electrode active materials is used.

EXAMPLE 5

A mixture of 86% of SnS (prepared in Synthesis A) as a negative electrode active material, 6% of graphite and 3% of acetylene black as conducting agents was mixed with 4% of polyvinylidene fluoride and 1% of carboxymethyl cellulose as binders. The mixture was kneaded together with water to prepare a slurry. The slurry was coated on both sides of a 18 μm thick copper foil by means of a doctor blade coater and, after drying, compressed by calendaring. The compressed sheet was cut to a prescribed size to prepare an 80 μm thick negative electrode sheet (9).

A mixture of 87% of $LiCoO_2$ as a positive electrode active material, 9% of graphite as a conducting agent, and, as binders, 3% of polytetrafluoroethylene and 1% of sodium polyacrylate was kneaded with water, and the resulting slurry was applied on both sides of a 20 μm thick aluminum foil (collector), dried, compressed by calendaring, and cut to a prescribed size to prepare a 257 μm thick positive electrode sheet (8).

A nickel or aluminum lead was connected by spot welding to the end of the negative electrode sheet (9) or positive electrode sheet (8), respectively. Both the electrode sheets with a lead were heated at 200° C. for 2 hours in dry air having a dew point of not higher than −40° C. The heating was conducted by using a far infrared ray heater.

Dried positive electrode sheet (8), finely porous polypropylene film separator (Cell Guard 2400), dried negative electrode sheet (9), and separator (10) were laminated in this order and rolled up by means of a winder.

The roll was put in cylindrical open-top battery case (11) made of nickel-plated iron which also served as a negative electrode terminal, and a 1 mol/l $LiPF_6$ solution in a 2:2:6 (by volume) mixture of ethylene carbonate, butylene carbonate, and dimethyl carbonate was poured into the case. Battery cover (12) with a positive electrode terminal was fitted into the top of case (11) via gasket (13) to prepare a cylindrical battery. Positive electrode terminal (12) and positive electrode sheet (8) were previously connected via a lead terminal, and battery case (11) and negative electrode sheet (9) were connected in the same way.

Figure 2:
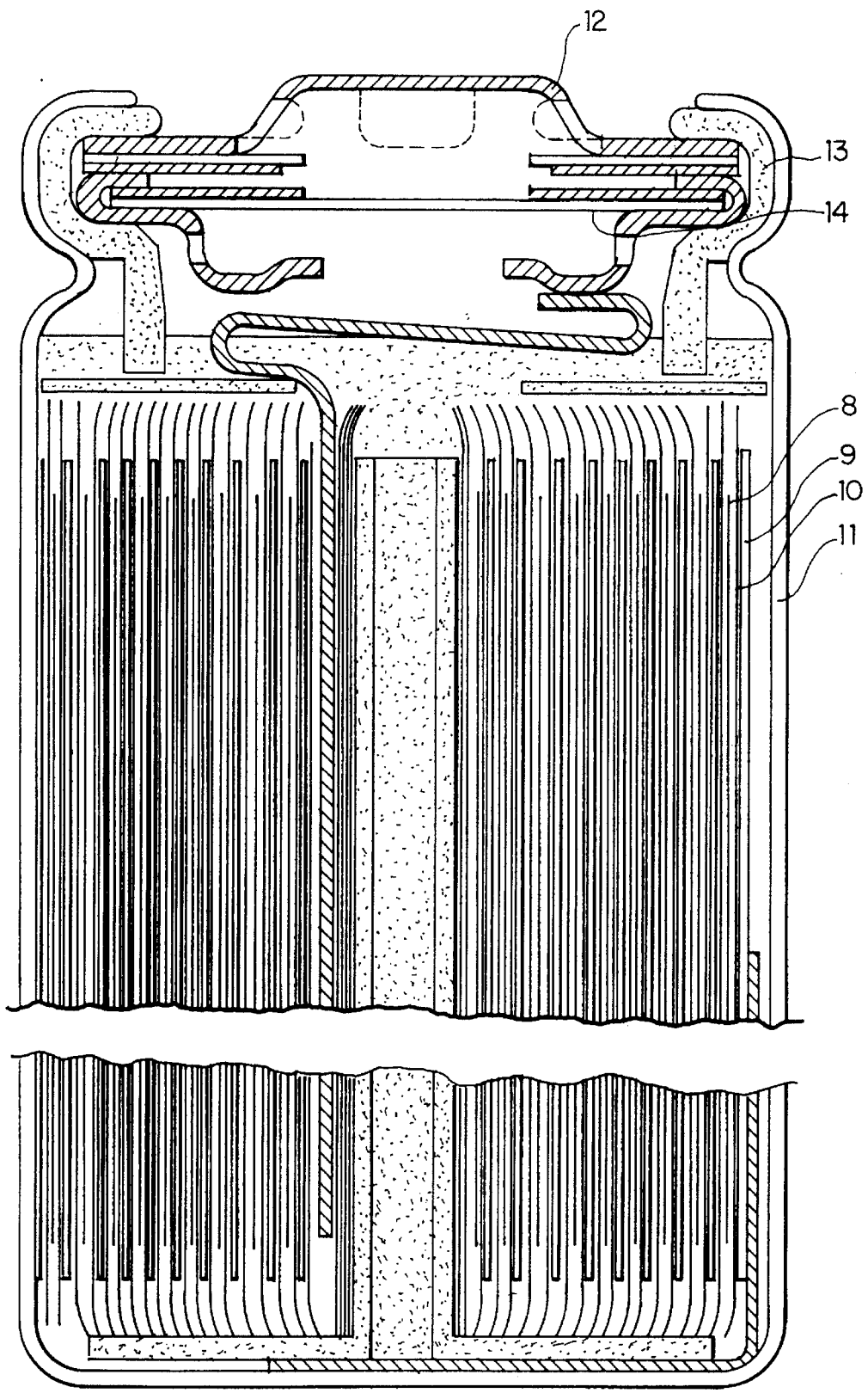
FIG. 2 is a cross section of a cylindrical battery prepared in Examples, wherein 8 indicates a positive electrode sheet, 9 indicates a negative electrode sheet, 10 indicates a separator, 11 indicates a battery case, 12 indicates a battery cover, 13 indicates a gasket, and 14 indicates a safety valve.

The cross section of the thus assembled cylindrical battery is shown in FIG. 2. Numeral (14) is a safety valve. The battery was subjected to a charge and discharge test under conditions of 4.3 to 2.7 V and 1 $mA/cm^2$. The results obtained are shown in Table 7. In Table 7, symbol (e) means a discharge capacity per ml of a C size battery.

TABLE 7

| Run No. | (b) (mAh/g) | (c) (V) | (d) (cycles) | (e) (mAh/ml) |
|---|---|---|---|---|
| 1 | 486 | 3.53 | 4.83 | 358 |

EXAMPLE 6 AND COMPARATIVE EXAMPLE 3

A coin type nonaqueous secondary batteries were prepared in the same manner as in Run No. 1 of Example 1 using SnS. Fifty batteries were tested by repeating charging and discharging 20 times at a current density of 5 mA/cm$^2$ and then dissembled. The negative electrode pellet was taken out to 60% RH air and observed whether spontaneous ignition would occur. As a result, none of them ignited.

For comparison, the same test was conducted, except for using a pellet (15 mm in diameter; 100 mg in weight) prepared by using an Li—Al (80%–20%) alloy as a negative electrode active material. As a result, 32 out of 50 ignited.

It can be seen from these results that the nonaqueous secondary battery according to the present invention is of high safety.

EXAMPLE 7

In order to examine how close the negative electrode active material of the present invention is to metallic lithium, an average potential of lithium deintercalation with reference to Li—Al (80%–20%) and its capacity were measured.

A coin lithium battery having the structure shown in FIG. 1 was assembled in a dry box (dew point: −40° to −70° C.; dry air) using the following materials.

Electrode

A negative electrode active material mixture consisting of 82% of each of the negative electrode active material precursors shown in Table 8 (prepared above), 8% of flake graphite and 4% of acetylene black as conducting agents, and 6% of polyvinylidene fluoride as a binder was compression molded into a pellet of 13 mm in diameter and 22 mg in weight. Before use, the pellet was dried in the above-described dry box by means of a far infrared heater at 150° C. for 3 hours.

Counter Electrode

An Li—Al (80%–20%) pellet of 15 mm in diameter and 100 mg in weight.

Collector

A 80 μm thick net of SUS316 was welded to each of a positive electrode case and a negative electrode case.

Electrolytic Solution

200 μl of a 1 mol/l solution of LiPF$_6$ in a 2:8 (by volume) mixed solvent of ethylene carbonate and dimethyl carbonate.

Separator

A finely porous polypropylene sheet and polypropylene nonwoven fabric impregnated with the electrolytic solution.

The resulting lithium battery was subjected to a charge and discharge test under conditions of a constant current density of 0.75 mA/cm$^2$, a voltage between 0.2 to 1.8 V. All the tests were started with intercalation of lithium into the compound of the present invention. The results obtained are shown in Table 8.

Symbols used in Table 8 to 11 hereinafter given have the following meanings:

(a) . . . negative electrode active material precursor of the present invention (b) . . . lithium deintercalation capacity in the first cycle (mAh/g-negative electrode active material precursor)

(c) . . . average potential (V) of lithium deintercalation (d) . . . cycle characteristics [(lithium deintercalation capacity in the 10th cycle—lithium deintercalation capacity in the 1st cycle)/lithium deintercalation capacity in the 1st cycle]

TABLE 8

| Run No. | (a) | (b) (mAh/g) | (c) (V) | (d) |
|---|---|---|---|---|
| 1 | SnS | 739 | 1.04 | 0.12 |
| 2 | SnS$_2$ | 570 | 1.02 | 0.09 |
| 3 | GeS | 500 | 0.90 | 0.08 |
| 4 | GeS$_2$ | 311 | 1.07 | 0.15 |
| 5 | PbS | 276 | 0.88 | 0.65 |
| 6 | Sb$_2$S$_3$ | 426 | 1.19 | 0.15 |
| 7 | Sb$_2$S$_5$ | 359 | 1.19 | 0.05 |
| 8 | GaS | 565 | 1.16 | 0.35 |
| 9 | Ga$_2$S$_3$ | 561 | 1.19 | 0.36 |

EXAMPLE 8

A coin battery was prepared in the same manner as in Example 7, except for using the following counter electrode:

A positive electrode active material mixture consisting of 82% of LiCoO$_2$, 8% of flake graphite, 4% of acetylene black, and 6% of tetrafluoroethylene was compression molded to obtain a pellet of 13 mm in diameter. The weight of the pellet was decided according to the lithium intercalation capacity of the negative electrode active material precursor and the total volume thereof. The charge capacity of LiCoO$_2$ was 170 mAh/g. Before assembly, the pellet was dried in the same manner as in Example 7.

The resulting lithium battery was subjected to a charge and discharge test under conditions of a constant current density of 0.75 mA/cm$^2$, a voltage between 4.3 and 2.8 V. All the tests were started with charging. The results obtained are shown in Table 9.

TABLE 9

| Run No. | (a) | (b) (mAh/g) | (c) (V) | (d) |
|---|---|---|---|---|
| 1 | SnS | 490 | 3.40 | 0.08 |
| 2 | SnS$_2$ | 430 | 3.40 | 0.06 |
| 3 | GeS | 174 | 3.45 | 0.05 |
| 4 | GeS$_2$ | 261 | 3.45 | 0.11 |
| 5 | PbS | 440 | 3.40 | 0.55 |
| 6 | Sb$_2$S$_3$ | 365 | 3.10 | 0.11 |
| 7 | Sb$_2$S$_5$ | 344 | 3.10 | 0.05 |
| 8 | GaS | 339 | 3.30 | 0.22 |
| 9 | Ga$_2$S$_3$ | 300 | 3.30 | 0.22 |

EXAMPLE 9

The same test as in Run No. 1 of Example 7 using SnS was conducted, except for using each of the positive electrode active materials shown in Table 10. The charging and discharging conditions were 4.3 to 2.8 V. The results obtained are shown in Table 10.

TABLE 10

| Run No. | Positive Electrode Active Material | (b) (mAh/g) | (c) (V) | (d) |
|---|---|---|---|---|
| 1 | $LiCoO_2$ | 490 | 3.40 | 0.14 |
| 2 | $LiNiO_2$ | 503 | 3.31 | 0.13 |
| 3 | $LiCo_{0.95}V_{0.05}O_{2.07}$ | 480 | 3.42 | 0.12 |
| 4 | $LiMn_2O_4$ | 455 | 3.43 | 0.11 |

COMPARATIVE EXAMPLE 4

An electrode pellet was prepared in the same manner as in Run No. 1 of Example 7, except for replacing the compound as a negative electrode active material with $TiS_2$. The same charge and discharge as in Example 8 was conducted. The results are shown in Table 11.

TABLE 11

| Run No. | Comparative Compound | (b) (mAh/g) | (c) (V) | (d) |
|---|---|---|---|---|
| 1 | $TiS_2$ | 141 | 2.95 | 0.35 |

EXAMPLE 10 AND COMPARATIVE EXAMPLE 5

A coin battery was prepared in the same manner as in Example 8, except for using SnS or $SnS_2$ as a negative electrode active material precursor. Fifty batteries for each negative electrode active material were tested by repeating charging and discharging 20 times at a current density of 5 mA/cm$^2$ and then disassembled. The negative electrode pellet was taken out to 60% RH air and observed whether spontaneous ignition would occur. As a result, none of them ignited.

For comparison, the same test was conducted, except for using a pellet (15 mm in diameter; 100 mg in weight) of an Li—Al (80%–20%) alloy as a negative electrode active material. As a result, 32 out of 50 ignited.

On comparing Examples 7 to 9 with Comparative Example 4, it was proved that the batteries using the compounds according to the present invention have a high discharge potential, satisfactory charge and discharge cycle characteristics, and a high discharge capacity.

Further, the negative electrode active material precursors of the present invention have a higher pellet density than that of a calcined carbonaceous material (1.1 to 1.4). In particular, SnS or $SnS_2$ has a pellet density of 3.0 to 3.5, which is about 2 to 3 times that of the latter, and also has about 2.5 times as high discharge capacity per unit weight as the latter. Because the molecular weight per equivalent of the former is twice that of the latter, it is seen that the discharge capacity per volume of the negative electrode active material according to the present invention is about 4 times that of the calcined carbonaceous material.

As demonstrated above, the use a Li-containing transition metal oxide as a positive electrode material and at lease one chalcogenide compound mainly composed of a Group 14 element of the Periodic Table, a Group 15 element of the Periodic Table, In, Zn, or Mg as a negative electrode active material provides a safe nonaqueous secondary battery having a high discharge potential, a high discharge capacity, and satisfactory charge and discharge cycle characteristics.

While the invention has been described in detail and with reference to specific examples thereof, it will be apparent to one skill in the art that various changes and modifications can be made therein without departing from the spirit and scope thereof.

What is claimed is:

1. A nonaqueous secondary battery comprising a positive electrode active material, a negative electrode active material, and a nonaqueous electrolyte containing a lithium salt, in which said negative electrode active material contains at least one chalcogenide compound composed of In, Ge, Sn, Pb, Sb, Bi, Si, As, or Mg.

2. A nonaqueous secondary battery as claimed in claim 1, wherein said negative electrode active material contains at least one chalcogenide compound composed of Ge, Sn, Pb, Sb, or Bi.

3. A nonaqueous secondary battery as claimed in claim 1, wherein said negative electrode active material contains a chalcogenide compound composed of Sn.

4. A nonaqueous secondary battery as claimed in claim 1, wherein said positive electrode active material is a lithium-containing transition metal oxide.

5. A nonaqueous secondary battery as claimed in claim 4, wherein said positive electrode active material contains at least one compound represented by formula $Li_xQO_y$, wherein Q represents at least one transition metal selected from Co, Mn, Ni, V, and Fe; x is from 0.2 to 1.2; and y is from 1.4 to 3.

6. A nonaqueous secondary battery as claimed in claim 5, wherein said positive electrode active material contains at least one compound selected from $Li_xCoO_2$, $Li_xNiO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ (wherein x=0.2 to 1.2; a=0.1 to 0.9; b=0.8 to 0.98; c=1.6 to 1.96; and z=2.01 to 2.3).

7. A nonaqueous secondary battery as claimed in claim 1, wherein said positive electrode active material comprises particles having the cumulative distribution of D (25%)=3 to 5 μm, D (50%)=4 to 6 μm, D (75%)=5 to 7 μm, and D (90%)=6 to 9 μm.

8. A nonaqueous secondary battery as claimed in claim 1, wherein the nonaqueous electrolyte is a $LiPF_6$ solution containing ethylene carbonate.

* * * * *